Patented July 24, 1951

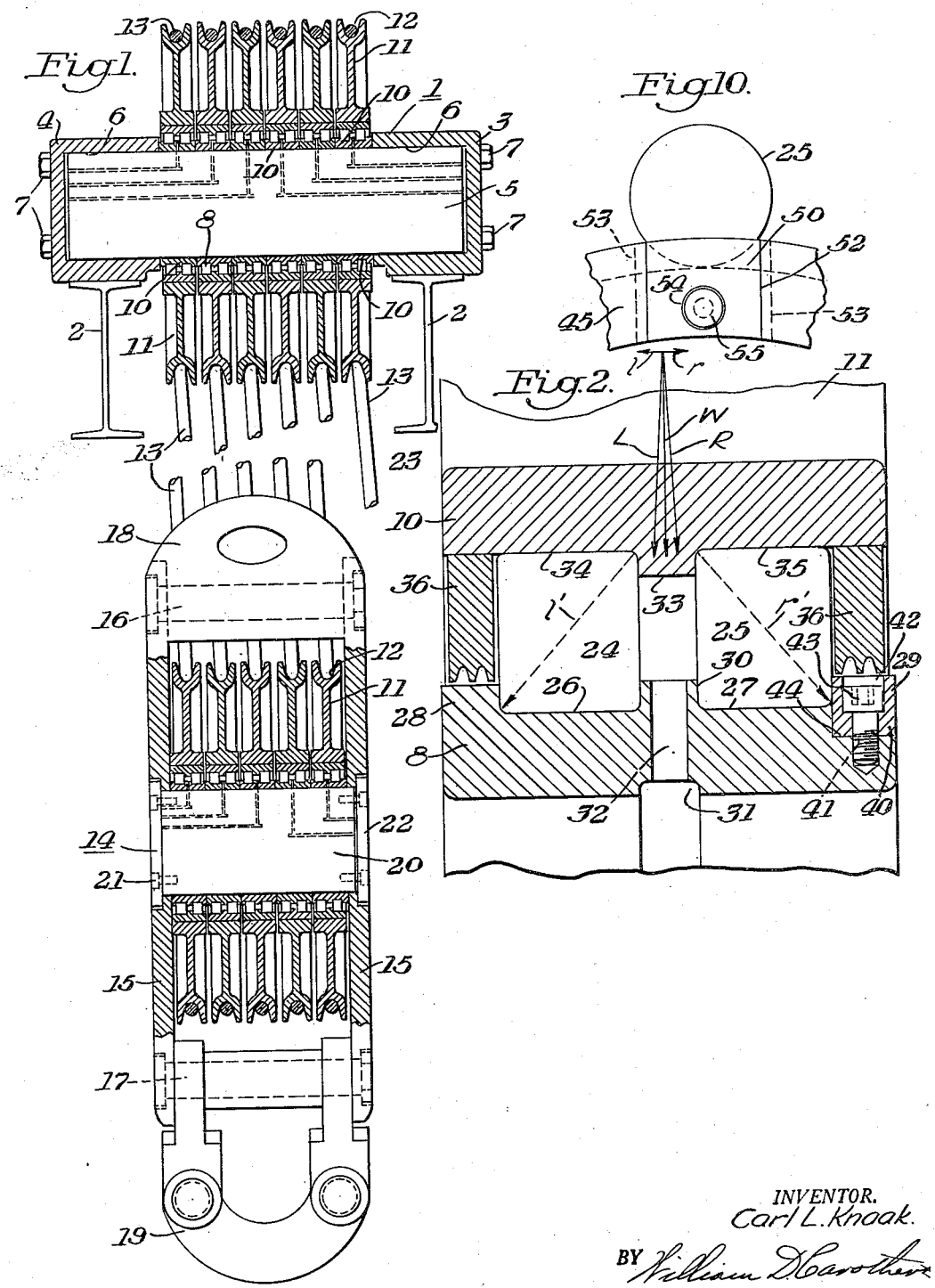

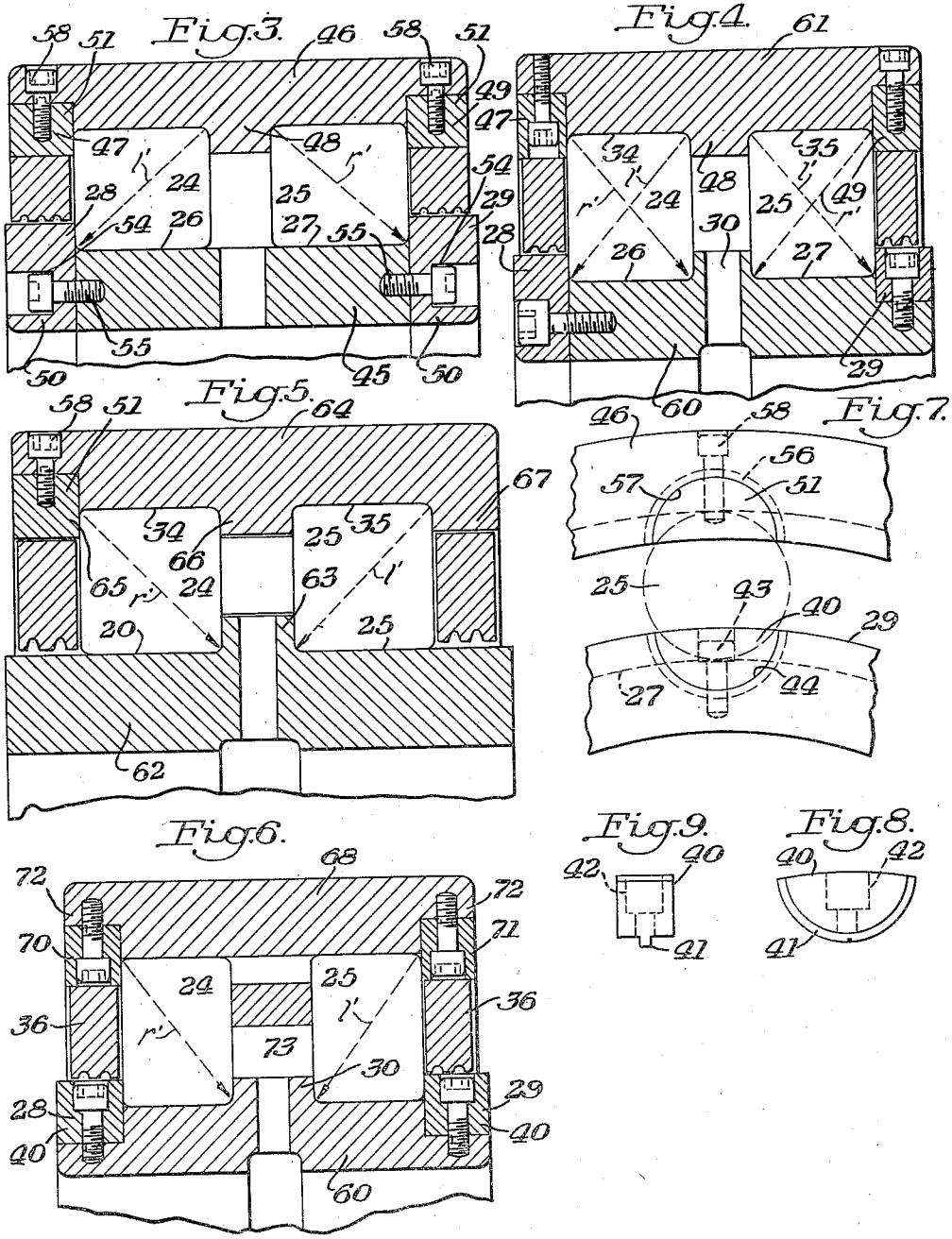

2,562,045

UNITED STATES PATENT OFFICE 2,562,045

CROWN BLOCK DOUBLE ROLLER BEARING

Carl L. Knaak, Pittsburgh, Pa., assignor of one-half to William G. Succop, Pittsburgh, Pa.

Application April 6, 1948, Serial No. 19,413

19 Claims. (Cl. 308—208)

This invention relates generally to bearing structures and more particularly to bearings for hoisting apparatus such as crown and traveling blocks for use on oil well derricks.

Bearings for traveling and crown block members must handle very heavy loads and the lateral thrust on the sheaves of both members creates side wear, particularly on the fast moving sheaves, even though the multiple sheaves are compact and mounted relatively close together. Bearings of a diameter nearly as great as the groove of the sheave have been employed to reduce the effectiveness of the wear of the lateral thrust but the speed of normal sheave operation was found to be too great for such large diameter bearings. Smaller diameter bearings, consisting of long rollers, on a multiple part inner race member, were then used to enable one to replace worn parts rather than the whole of the bearing but the wear continues and operators replace the whole of the bearing rather than a worn part.

The roller bearing must transmit the lateral thrust from the top of one edge to the bottom of the diagonally opposite edge. Thus, the thrust forces are disposed at a considerable angle to the flight of the cable which concentrates the lateral thrust and wears on the bearing lips or shoulders causing increased wear due to the sliding surface contact between these parts.

Another practice is to employ opposed tapered roller bearings for the fast sheaves in the crown and traveling blocks to assume the lateral thrust. These bearings are constructed with double inner race members each having lips on both sides. The vertical load on the sheaves is so much greater than the lateral thrust that wear on the lips and rollers is greater in these bearings than the advantage in opposing lateral thrust by a taper.

The present invention overcomes these difficulties to a very high degree by providing the traveling and crown block sheaves having a double roller bearing with a single race and wherein the diagonal lateral thrust through a roller is closer to being in phase with the line of the flight of the cable line. The horizontal and vertical components of the diagonally disposed lateral thrust are equal or even favor the vertical component which is a rolling contact. The smaller or horizontal component meets with sliding friction at the end of the roller against the bearing lip. These improvements and advantages are obtainable by the use of two sets of short cylindrical rollers, the axes of which are parallel. It has been found to be preferable to employ unitary race members for these bearings which includes novel means for the introduction and retention of the rollers into the race member.

Other objects and advantages appear in the following description and claims.

The accompanying drawings show, for the purpose of exemplification without limiting the invention or claims thereto, certain practical embodiments of the invention wherein:

Fig. 1 is a view in cross-section of a crown and a traveling block with their bearing structures;

Fig. 2 is an enlarged fragmentary view in section of a single sheave bearing as shown in Fig. 1 with a single central lip on the outer race and three lips on the inner race member;

Fig. 3 is an enlarged fragmentary view in section of a single sheave bearing with three lips on the outer race and two lips on the inner race;

Fig. 4 is an enlarged fragmentary view in section of a bearing with three lips on each race member;

Fig. 5 is a similar view of a bearing structure with three lips on the outer race and one lip on the inner race;

Fig. 6 is a similar view of a bearing structure with two lips on the outer race and three lips on the inner race;

Fig. 7 is an enlarged fragmentary view in elevation of a bearing structure having a removable lip insert as shown on the right in Fig. 4;

Fig. 8 is an enlarged side view of a lip insert;

Fig. 9 is an end view of the structure shown in Fig. 8; and

Fig. 10 is an enlarged fragmentary view in elevation of the removable insert shown on the lower left of Fig. 4.

Referring to Fig. 1 of the drawings, the crown block 1 is supported on the parallel beams 2 welded together and arranged to be secured to the top of the derrick structure. This crown block consists of the saddle members 3 and 4 bolted to the tops of the beams 2 for retaining the ends of the shaft or pin 5. The saddles have sockets 6 which receive the ends of the pin 5 and hold the latter in place by the bolts 7. The saddle members are spaced from each other to receive only the proper number of inner bearing race members 8 of which there are six shown. Each inner race has a corresponding outer race member 10 over which the sheaves 11 are shrunk. Each sheave 11 is provided with an annular groove 12 in which the cable 13 rides.

The inner race members 8 are longer axially than the outer race members 10 in order to provide clearance between adjacent sheaves 11.

The traveling block 14 has one less sheave 11 than the crown block but their structures are the same and the sheaves are ordinarily interchangeable. The traveling block consists of the side plates 15 connected by the upper and lower pins 16 and 17 and to which are respectively attached the bail 18 and the clevis 19. The shaft or bearing pin 20 has its ends seated in the side plates 15 and is held in place by the shaft retainers 21 and 22 bolted to the shaft 20. Individual lubricant lines are carried from each bearing to the closest shaft end where they may be properly supplied with a lubricant.

The cable 13 is indicated as being woven straight across the crown and traveling block to provide the least amount of lateral thrust on the intermediate sheaves of the crown and traveling block. If a pull is exerted on the cable 23, which is not straight, the lateral thrust on each of the crown and traveling block sheaves is to the right as the flight of the cable running off the sheave is toward the right with respect to the central plane of the sheave. If the cable is released and the traveling block moves away from the crown block the thrust on the sheaves is in the opposite direction. The amount of lateral thrust on the sheaves is of course determined by the amount of load carried by the blocks and the degree of pitch or misaligned pull on the cable. As the traveling block approaches the crown block the pitch of the cable increases, which increases the lateral thrust. The contrary is also true. However, the thrust load is only a very small fraction of the vertical or lift load but is difficult to counteract as the ends of the roller bearings are in frictional sliding contact with the lips of their races whereas the cylindrical or load bearing surfaces are in rolling contact.

The resultant forces of the traveling load are longitudinally of the several flights of the cable 13 as shown in Fig. 1 and are disposed at a slight angle to the vertical as indicated in Fig. 2 by the vectors R and L which represents the right or left cable forces on the loaded traveling block 14. The horizontal components $r$ and $l$ represent the corresponding lateral thrust load of their respective force R and L and the central vector W represents the weight or vertical load assumed by the rolling surfaces of the bearings.

The sheave bearings of Fig. 1 are the same as shown in Fig. 2 and consist of preferably two full complements of rollers 24 and 25, which are shorter in length than their diameters. The inner race 8 has two cylindrical bearing surfaces 26 and 27 bounded by the outer lips 28 and 29. It is preferable to employ a central lip such as shown at 30 to provide a guide for the rollers but this is the only purpose of this lip. An annular lubricant groove 31 is provided on each inner race and has a radial lubricant port 32 to the center of the bearing between the two roller complements.

The outer race 10 is provided with only one annular lip 33 which is centrally disposed to provide on each side thereof a cylindrical bearing surface 34 and 35 for receiving the bearing complements 24 and 25, respectively. The lips 30 and 33 may be substantially the same width but 30 could be narrower than 33. The space that these lips form provides a lubricant chamber within the bearing and may also be used to receive a cage for both bearings if they are not full complement bearings as indicated. The outer sides of the bearing are closed by the lubricant retaining rings 36 that are pressed into the bearing surfaces 34 and 35 and have labyrinth grooves on their edges adjacent the annular lips 28 and 29.

Both rollers 24 and 25 assume their portion of the radial load W and transmit it to the race by rolling engagement at all times, but only the rollers in one race of this bearing will assume the lateral thrust at a time. If the lateral thrust illustrated by the vector $r$ is applied, only the roller 25 will assume this lateral force along the diagonal vector $r'$ from the lip 33 to the lip 29. If the thrust is to the left the diagonal vector $l'$ represents the thrust forces through roller 24 from lip 33 to lip 28 and the other roller 25 merely carries its proportionate radial load W but no thrust. Thus, the alternate lateral thrust forces are assumed by their respective roller complements and the other roller complement merely carries its radial load without thrust and they both assume their part of the radial load which is not true of other crown and traveling block structures.

The lips 28, 29, 30 and 33 of the bearing structure shown in Fig. 2 are formed integral and continuous with their respective bearing race members. However, the lip 29 must be provided with an insert to permit the assembly of the roller complement 25 in the bearing. When the bearing is being assembled the full complement 24 is placed on the bearing 26 of the inner race and the bearing surface 34 of the outer race is slid thereover until the rollers are engaged by the intermediate lip 33 of the outer race. In order to assemble the roller complement 25 it is necessary to remove the insert 40 which is shown in Figs. 8 and 9 and consists of the arcuate block having a perimetral flange 41 and provided with a socket 42 for receiving the set screw 43. The lip 29 of the inner race member 8 is provided with complementary socket 44 for receiving the insert 40 as shown in Figs. 2 and 7. The socket 44 of the race member and the cylindrical arcuate surface of the insert are ground so that the latter fits within the former and is held in place by the set screw 43, then the whole of the inner race member 8 is ground so that the side surfaces of the insert 40 match the adjacent surfaces of the lip 29 when the bearing is finished. As noted in Fig. 7 the socket 44 and the insert 40 are of greater dimension than the thrust segment of one of the rollers 25 and when the insert 40 is removed the rollers 25 may be slid one at a time through the socket 44 and between the bearing surfaces 27 and 35 to make up the complete roller complement 25. After the last roller has been inserted in this bearing the insert 40 is replaced and locked in position. The oil rings 36 are then inserted on both sides of the bearing and the bearing is completely assembled and ready for application. The side surfaces of the socket 44, together with the arcuate flange 41, provide adequate strength to resist the forces for that short interval of time which an independent roller of the complement 25 bears against the insert. All the rest of the time the lateral forces from the rollers 25 are transmitted directly to the lip 29.

In the structures of Figs. 3, 4 and 5 the rollers of the bearing complements may be termed square rollers as the diameter of each roller is equal to its length whereas the rollers of Figs.

2 and 6 are shorter than their diameter. This dimension determines the angle of the thrust forces $r'$, $l'$.

The inner race member 45 of the bearing structure shown in Fig. 3 is provided with the outer lips 28 and 29 but is not provided with a central lip. The outer race member 46 is provided with three lips 47, 48 and 49. In a bearing structure having opposed outer lips such as illustrated in Figs. 3, 4 and 6, it is of course necessary to provide an insert for each of the outer lips. In Fig. 3 the lips 28 and 29 are provided with the insert 50 and the lips 47 and 49 are provided with the insert 51. The inserts 50 are illustrated in Fig. 10 as a block having either diverging or parallel sides 52, each of which is provided with a centrally disposed flange 53 arranged to fit complementary grooves in the inner race member. The outer and inner surfaces of the block 50 are arcuate and match the corresponding surfaces of the lips and the bore of the inner race member. The transverse opening 54 is provided through inserts 50 for receiving the set screws 55 which hold the inserts in position. Although the sides 52 of the block shown are parallel, they of course can be made wedge shape in either direction. In assembling the left and right bearing complements 24 and 25 it is of course necessary to match the inserts of the inner and outer races and remove the same in order to admit the rollers. In Fig. 3 it will be noted that the lateral thrust forces $r'$ and $l'$ are directed from the center lip 48 of the outer race member to the outer lips 28 and 29 of the inner race member in the same manner as that illustrated with reference to Fig. 2.

The inserts 51 as shown in Fig. 3 are also illustrated in Fig. 7 wherein they are provided with an arcuate flange 56 arranged to be received in the arcuate socket 57 and held in place by the set screw 58.

In the structure of Fig. 4 the inner race member 60 and the outer race member 61 are both provided with three lips defining the matched bearing surfaces 26 and 34, 27 and 35 for receiving the roller complements 24 and 25, respectively. In this case each of the rollers is utilized to transmit the thrust forces. The right thrust forces $r'$ are transmitted from the lip 47 to the lip 30 and from the lip 48 to the lip 29 between the outer and inner race members. The left thrust forces $l'$ are likewise transmitted as indicated between the central lip 48 of the outer race and the outer lip 28 of the inner race and the outer lip 49 of the outer race and the inner lip 30 of the inner race. Thus, the lateral forces in each instance are divided between the rollers and are transmitted to the parallel surfaces.

The structure illustrated in Fig. 5 is the inverse of that shown in Fig. 2. The inner race 62 is provided with a centrally disposed flange 63 and the outer race 64 is provided with three lips 65, 66 and 67. In this structure only one of the outer lips of the outer race member 64 need be provided with an insert, such insert being shown at 51 in the lip 65. This structure being the inverse of that shown in Fig. 2, the lateral thrust forces are likewise inverted. The lateral forces $r'$ being transmitted from the lip 65 of the outer race member 64 to the intermediate lip 63 of the inner race member 62 and the lateral thrust forces $l'$ being transmitted from the lip 67 of the outer race member to the central lip 63 of the inner race member as indicated in Fig. 5 and, as was the case of the structures shown in Figs. 2 and 3, the lateral thrust is only assumed by one roller complement at a time.

The structure of Fig. 6 is the inverse of the structure illustrated in Fig. 3 wherein the inner race member 60 is provided with three lip members 28, 29 and 30, each of the outer lips being provided with inserts 40 and the outer race member 68 is provided with two lip members 70 and 71, each having an insert member 72. In this structure the outer race member is not provided with a central lip and the lateral thrust forces $r'$ must be transmitted from the lip 70 of the outer race member to the central lip 30 of the inner race member and the lateral thrust forces $l'$ must be transmitted from the lip 71 of the outer race member to the central lip 30 of the inner race member as indicated at Fig. 6. In response to the transmission of lateral thrusts this structure functions similar to that shown in Fig. 5.

In each of these structures it will be noted that the inner and outer race members are each made from a single piece of steel and are provided with inserts in their lips sufficiently large to fill a socket that is just slightly greater than the dimension of the thrust segment of the roller making up the complement. This bearing structure is particularly advantageous for use as bearings in the sheaves of crowned and traveling blocks owing to the fact that the rollers are relatively short and may be more readily guided to prevent skewing which action increases the lateral thrust forces and induces greater wear in the bearing. Another advantage is the fact that by properly selecting the arrangement of the double roller bearing full control of the direction and application of the lateral thrust forces may be obtained. If it is not desirable to employ a full bearing complement the central chamber may be provided with a caged structure as illustrated at 73 in Fig. 6 for maintaining the rollers in uniform spaced relation. Thus, the cage does not in any way interfere with the oil rings 36 which, when pressed into position in the bore of the outer race member, lock the inserts in place and prevent the removal of the set screws from the inserts in the inner race member. It has been found that an integral race member such as disclosed is less expensive to produce and provides longer bearing life than a bearing having its race members made in parts whether the parts are clamped in assembled relation or bolted to each other.

While, for clarity of explanation, certain preferred embodiments of this invention have been shown and described, it is to be understood that this invention is capable of many modifications, that changes in the construction and arrangement may be made therein and that certain parts may be employed without conjoint use of other parts and without departing from the spirit and scope of this invention.

I claim:

1. An antifriction bearing structure comprising a race member having an annular bearing groove bounded by spaced radially disposed lips, means defining a socket greater in dimension than the thrust segment of a roller in one of the lips, an interlocking insert formed to fit said socket to retain the rollers assembled within the race and provide a continuous lip thrust surface for the rollers, and means to fasten the insert in the socket.

2. An antifriction bearing structure comprising a race member having an annular bearing groove bounded by spaced radially disposed lips, means defining a socket of greater dimension than the thrust segment of a roller in one of said lips, an insert formed to fit the socket, interlocking means cooperating between the socket and the insert so the latter will retain the rollers assembled within the race and provide a continuous lip thrust surface for the rollers, and means to fasten the insert in the socket.

3. An antifriction bearing structure comprising a race member having an annular bearing groove bounded by spaced radially disposed lips, means defining a socket of greater dimension than the thrust segment of a roller in one of said lips, a slot in the marginal edges defining the socket, an insert formed to fit the socket and having flange means complementary to the slot in the socket to retain the rollers assembled within the race and provide a continuous lip thrust surface for the rollers, and means to fasten the insert in the socket.

4. An antifriction bearing structure comprising a race member having an annular bearing groove bounded by spaced radially disposed lips, means defining an arcuate socket greater in dimension than the thrust segment of a roller in one of said lips, an arcuate slot in the marginal edge defining the socket, an arcuate insert formed to fit the socket and having a mating arcuate flange fit the slot to retain the rollers assembled within the race and provide a continuous lip thrust surface for the rollers, and means to lock the insert in the socket.

5. An antifriction bearing structure comprising a race member having an annular bearing groove bounded by spaced radially disposed lips, means defining a socket with spaced opposed edges making a gap in one of said lips of greater dimension than the thrust segment of one roller, a slot in each of the edges of the socket, a flanged insert shaped to mate in the socket to retain the rollers assembled within the race and provide a continuous lip thrust surface for the rollers, and means to retain the insert in the socket.

6. An antifriction bearing structure comprising a race member having an annular bearing groove bounded by spaced radially disposed lips, means defining a socket with spaced opposed parallel edges making a gap in one of said lips of greater dimension than the thrust segment of one roller, a slot in each of the edges of the socket, a flanged insert shaped to mate in the socket to retain the rollers assembled within the race and provide a continuous lip thrust surface for the rollers, and means to retain the insert in the socket.

7. An antifriction bearing structure comprising a race member having an annular bearing groove bounded by spaced radially disposed lips, means defining a socket with spaced opposed converging edges making a gap in one of said lips of greater dimension than the thrust segment of one roller, a slot in each of the edges of the socket, a flanged insert shaped to mate in the socket to retain the rollers assembled within the race and provide a continuous lip thrust surface for the rollers, and means to retain the insert in the socket.

8. An antifriction bearing structure comprising a race member having an annular bearing groove bounded by spaced radially disposed lips, means defining a socket greater in dimension than the thrust segment of the roller in one of the lips, an interlocking insert formed to fit said socket to retain the rollers assembled within the race and provide a continuous lip thrust surface for the rollers, and a cap screw for fastening the insert in the socket.

9. An antifriction bearing structure comprising a race member having an annular bearing groove bounded by spaced radially disposed lips, an arcuate socket of uniform curvature interrupting the continuity of one lip, said socket being greater in dimension than the thrust segment of a roller, an arcuate slot centrally disposed in the socket, an arcuate insert having a centrally disposed flange to fit the slot and socket to retain the assembled rollers within the race and provide a continuous lip thrust surface for the rollers, and a cap screw shouldered on the insert and engaging the race to hold the insert in position.

10. In a roller bearing, the combination of an inner race member, an outer race member constructed to cooperate with the inner race member, oppositely disposed radially projecting annular lips on each race member, a second radially projecting annular lip on one of said race members uniformly spaced from the other lip on said race member to define cooperative annular bearing grooves on the inner and outer race members, a series of rollers arranged to provide a full bearing complement in said cooperative annular bearing grooves, and an interlocking insert of greater dimension than a thrust segment of the rollers removably mounted in said second lip for the insertion of the rollers in turn into the cooperative annular bearing grooves.

11. In a roller bearing, the combination of an inner race member, an outer race member constructed to cooperate with the inner race member, oppositely disposed radially projecting annular lips on the central portion of each race member, a radially projecting annular lip on each end of one race member which cooperates with the central lips to define a pair of annular bearing grooves on the inner and outer race members, a series of rollers arranged to provide a full bearing complement in each of said annular bearing grooves, and an interlocking insert of greater dimension than a thrust segment of the rollers removably mounted in one of said outer lips for the insertion of the rollers of the adjacent complement in turn.

12. In a roller bearing, the combination of an inner race member, an outer race member constructed to cooperate with the inner race member, a radially projecting annular lip on the central portion of one race member, a radially projecting annular lip on each end of the other race member which cooperates with the central lip on the first race member to define a pair of annular bearing grooves, a series of rollers arranged to provide a full bearing complement in each of said annular bearing grooves, and an interlocking insert of greater dimension than a thrust segment of the rollers removably mounted in one of said end lips for the insertion of the rollers of the adjacent complement in turn.

13. In a roller bearing, the combination of inner and outer race members constructed to cooperate with one another, a pair of spaced oppositely disposed radially projecting annular lips on each race member forming cooperative annular bearing grooves, a series of rollers arranged to provide a full bearing complement in said cooperative annular bearing grooves, and an interlocking insert of greater dimension than a thrust segment of the rollers removably mounted in each of an opposed pair of said lips for the insertion of the rollers of the complement in turn.

14. In a crown and traveling block structure, the combination of a plurality of sheaves, each having a central opening, a supporting member extending through the central openings of the sheaves, an outer bearing race member fixed in the opening of each sheave and surrounding said support, an inner bearing race member on said support for each outer bearing race member, one of said race members having an integral intermediate radial lip centrally aligned in said sheave and the other race member having spaced integral radial lips on each side of said intermediate lip, an interlocked insert in one of said spaced radial lips, a set of cylindrical bearing rollers in said race members between said intermediate radial lip of said one race member and one radial lip of said other race member, and a second set of cylindrical bearing rollers in said race members between said intermediate radial lip of said one race member and the other radial lip of said other race member, and retaining means to hold said inner race members on said support.

15. In a crown and traveling block structure, the combination of a pin supported to carry sheaves, each of which has a central opening, a double groove outer bearing race member fixed in each sheave opening, a double groove inner bearing race member mounted on said pin to match with each outer race member, a set of rollers for each pair of matched grooves in the inner and outer bearing race members, lip means formed integral with each bearing race member which defines the grooves and cooperates to retain the two sets of rollers in each pair of inner and outer bearing race members and centered relative to the sheave, and insert means removably secured in interlocked relation in said lip means and of greater dimension than the thrust segment of a roller to permit the rollers to be inserted in the grooves.

16. In a crown and traveling block structure, the combination of a pin supported to carry sheaves, each of which has a center opening, a double groove outer bearing race member fixed in symmetrical centered relation with each sheave opening, a double groove inner bearing race member mounted on said pin to match with each outer race member, a set of rollers for each pair of matched grooves in the inner and outer bearing race members, a central lip defining the grooves of one bearing race member and outer lips defining the grooves of its associated bearing race member, and an insert of greater dimension than a lip thrust segment of a roller removably secured in one of the outer lips for receiving and retaining both sets of rollers in their grooves.

17. In a crown and traveling block structure, the combination of a pin supported to carry sheaves, each of which has a center opening, a double groove outer bearing race member fixed in symmetrical centered relation with each sheave opening, a double groove inner bearing race member mounted on said pin to match with each outer race member, a set of rollers for each pair of matched grooves in the inner and outer bearing race members, a central and two outer lips defining the grooves of one bearing race member and spaced outer lips defining the grooves of its associated bearing race member, and inserts of greater dimension than a lip thrust segment of a roller removably secured and interlocked in each outer lip for receiving and retaining the rollers in the grooves.

18. In combination, a sheave having a hub, an outer bearing race centered in said hub and an inner bearing race therefor, a pair of thrust receiving radially extending lips on one race and a single radially extending centered lip on the other race forming two roller tracks between said races, a complement of rollers in each track, a roller loading insert formed as a part of and interlocked with one of said pairs of lips, and means to hold the insert in place independent of the roller thrust.

19. In combination, a sheave having a hub, an outer bearing race centered in said hub and an inner race therefor, a pair of thrust receiving oppositely disposed radially extending lips on each race, a single radial lip centered between the pair of radial lips on one race forming two roller tracks between said races, a complement of rollers in each track, a roller loading insert formed as a part of and interlocked with each of said pairs of lips, and means to hold the insert in place independent of the roller thrust.

CARL L. KNAAK.

REFERENCES CITED

The following references are of record in the file of this patent:

UNITED STATES PATENTS

| Number | Name | Date |
| --- | --- | --- |
| 1,178,526 | Laycock | Apr. 11, 1916 |
| 1,200,445 | Laycock | Oct. 3, 1916 |
| 1,738,984 | Brown | Dec. 10, 1929 |
| 1,970,699 | Herrmann | Aug. 21, 1934 |
| 1,995,571 | Lott | Mar. 26, 1935 |
| 2,274,099 | Smith et al. | Feb. 24, 1942 |
| 2,292,457 | Maier | Aug. 11, 1942 |